United States Patent [19]
Brous et al.

[11] Patent Number: 6,032,571
[45] Date of Patent: Mar. 7, 2000

[54] AUTOMATED HOME BEER BREWING MACHINE AND METHOD

[76] Inventors: Brad Brous, 11430 Faisan Way, San Diego, Calif. 92124; Curt N. Torgerson, 5047 August St., San Diego, Calif. 92104; Terry Dubson, 1880 Summit Dr., Escondido, Calif. 92027; Craig A. Wright, 2534 San Marcos Ave., San Diego, Calif. 92104

[21] Appl. No.: 09/174,703

[22] Filed: Oct. 19, 1998

Related U.S. Application Data

[62] Division of application No. 08/851,696, May 6, 1997.
[51] Int. Cl.$^7$ .................................................. C12C 13/10
[52] U.S. Cl. .......................... 99/277.2; 99/348; 366/249
[58] Field of Search ............................. 99/277.1, 277.2, 99/348, 278, 276; 366/244, 245, 246, 247, 248, 249, 222, 223, 224

[56] References Cited

U.S. PATENT DOCUMENTS

| | | | |
|---|---|---|---|
| 4,503,502 | 3/1985 | Chapin | 99/348 X |
| 4,649,810 | 3/1987 | Wong | 99/348 X |
| 5,365,830 | 11/1994 | MacLennan et al. | 99/276 |

Primary Examiner—Reginald L. Alexander
Attorney, Agent, or Firm—Oppenheimer, Wolff & Donnelly LLP

[57] ABSTRACT

An automated home beer brewing machine and method makes beer in a single vessel under automatic control. The machine and method allows making of wort for beer without requiring apparatus to be sanitized, without boiling the wort, without the use of a traditional water-filled fermentation lock, and without using a wort chiller or ice-packing of a brewing pot. The inventive single-vessel automated brewing operation allows the user to load ingredients, conduct a grain-steeping if desired, and then automatically carries out the rest of the brewing process in a single vessel, until summoning the user days later to sugar-prime and bottle the beer. Thus, the user is required to provide much less time and labor than conventional home beer brewing, and the invention also frees the home-hobby brewer of much of the current art traditionally attached to home brewing.

18 Claims, 11 Drawing Sheets

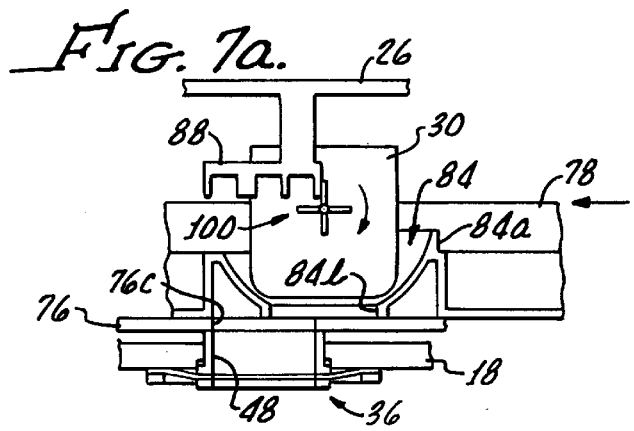
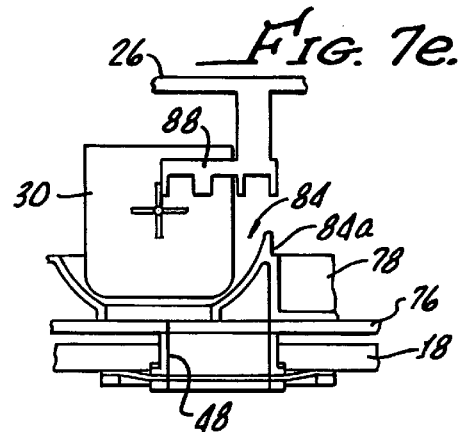
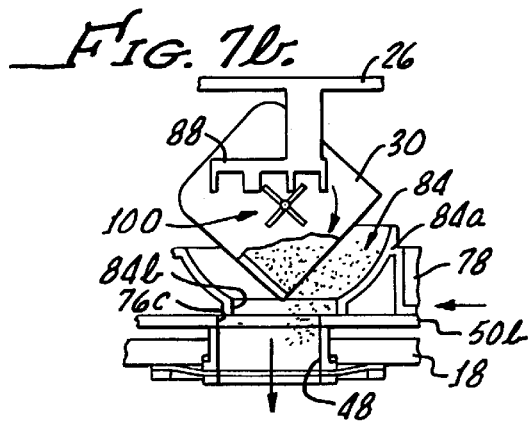
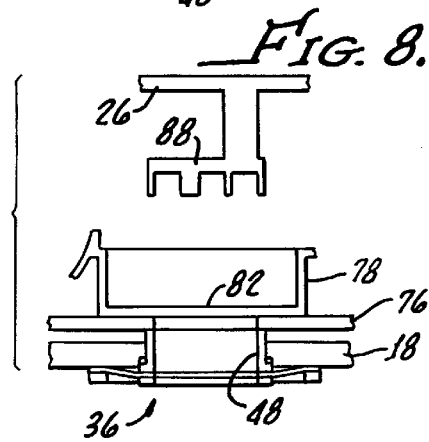
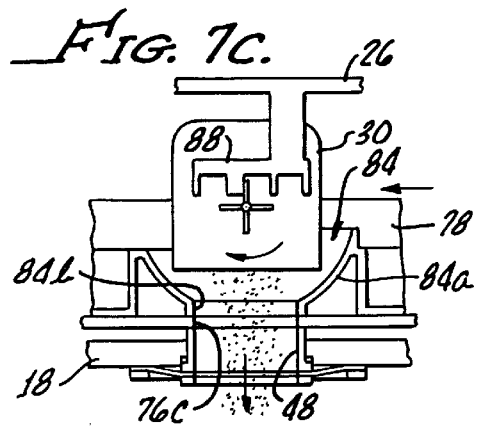
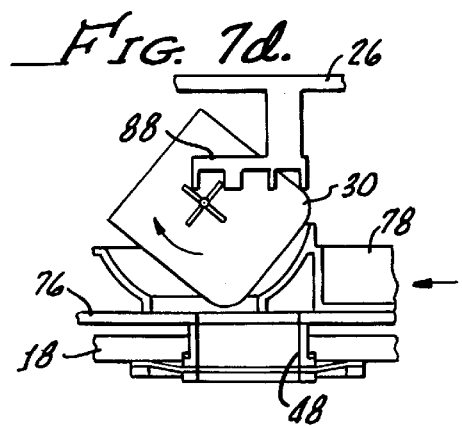
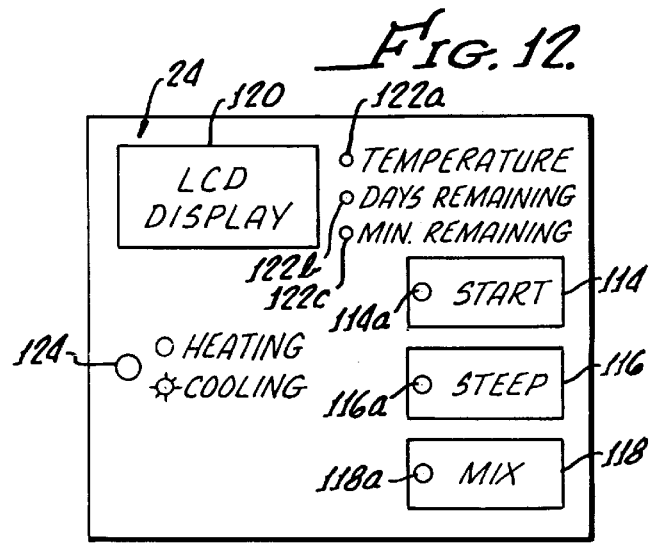

AUTOMATED HOME BEER BREWING MACHINE AND METHOD

This application is a divisional application of U.S. patent application Ser. No. 08/851,696, filed May 6, 1997. The entire disclosure of the prior application is considered as being part of this disclosure and is hereby incorporated by reference herein.

BACKGROUND OF THE INVENTION

1. Field of the Invention

The present invention relates to methods and apparatus for brewing beer at home. More particularly, the present invention relates to a method and apparatus for automated home brewing of beer, which requires much less labor and time than conventional home brewing, and which also frees the home brewer of much of the folk-art traditionally attached to home brewing.

2. Related Technology

A conventional way to brew beer at home involves the use of labor-intensive apparatus and techniques passed down through the years. Because of the long tradition of home beer brewing, a considerable art has attached to this activity. Generally, this art of home-brewing beer is an adaptation or extrapolation of from large-scale brewing techniques.

Traditional brewing of beer at home requires considerable dedication and care from the home brewer, especially in view of the tradition attached with the making of good beers at home. This brewing process requires tedious preparation and assembly of the equipment coupled with precise addition of ingredients under carefully controlled conditions. Such rigors are not easily followed by the average home brewing hobbyist, and this can lead to the production of batches of beer with inconsistent and poor quality, spoiled beer, and other failures of the process.

Beer, ale, and other fermented malted grain alcoholic beverages generally consist of four ingredients: water; fermentable sugars (usually derived from malt or malt extracts); hops for flavor, bitterness, and aroma; and yeast (both for flavor and for the fermentation used first to produce alcoholic content, and which is then used also to provide carbonation in bottle-conditioned beer). In this disclosure, the term "beer" is used inclusively to encompass all of these beverages. In some cases, part of the sugars and carbohydrates consumed by the yeast in the fermentation process are acquired by steeping grain in hot water.

The traditional home brewer may use a wort pot, and bucket fermenter with a gasketed lid and a fitting for a water-filled fermentation lock. Also used in the process are a bottling bucket, bottling siphon, hydrometer, wort chiller, bucket brush, and sanitizing chemicals so that all the apparatus can be sanitized before use. A starter of a good live brewer's yeast is also necessary. Careful sanitizing and particular procedures carried out in a particular order are generally necessary in order to make good beer, and to prevent spoiled beer. Spoiling of beer happens, for example, when microbes from the environment get into the wort and grow instead of or along with the working yeast (i.e., the "wort" is the weak solution of sugars and organic ingredients from grains, malt, and hops which will become beer after a first fermentation at ambient pressure to produce alcohol, and a second fermentation in a pressure vessel [i.e., in a beer bottle] to provided carbonation). Understandably, wort is both a fermentation medium, and also provides a fertile culture medium for undesirable microbes from the environment.

In the brewing of beer at home, after all the equipment is sanitized the brewer does not touch certain parts of the equipment, and is even cautioned against breathing on the equipment. The actual process of home brewing beer involves making and fermenting "wort". The usual home brew recipe makes about five gallons of beer. The wort is made, for example, by putting five gallons of water into a stock pot, adding malt or malt extract to the water, crushing grain, placing the grain in a fabric bag (a muslin bag, for example), and adding this bagged grain to the hot water, heating the water and grain bag toward but short of a boil, holding the water at about 160° F. to steep the grains for a period of time, increasing the heat and removing the grain bag before the water boils, and then bringing the water to a boil.

After the water reaches a boil a liquid malt extract is added and stirred into the mixture. Spray-dried malt extract may also be added. Again the wort is brought to a full boil, a first addition of hops (bittering hops) is carried out, and the wort is held at a boil for 60 minutes, with care being exercised to not boil the pot over. Next, a second addition of hops (flavoring hops) are added. In the last 5 minutes of this boil, irish moss may be added to clarify the wort. The last addition of hops (aroma hops) are added and heating of the wort is stopped. A wort chiller or ice packing of the stock pot is used to cool the wort as quickly as possible to about 90° F. or less.

Next, the yeast is added to the bucket fermenter. Various strains of yeast are used to modify the flavor of the beer. This yeast is added to the bottom of a fermenting bucket, and the wort is poured carefully from the stock pot into the bucket fermenter using care to maintain the pre-sanitized condition of the vessels. The temperature of the yeast and wort should not to differ by more than 15° F., in order to avoid shocking or killing the yeast. Next, the fermenter is capped, and water is added to the fermentation lock to allow carbon dioxide produced by fermentation to escape, while preventing the introduction of ambient air and microbes. The total time requirement for the home brewer to this stage of the process is from a minimum of about 2 hours and 40 minutes to as much as 8 hours of time.

After a number of days have passed (usually 8 to 10days) and the bubbling at the fermentation lock has ceased, the bucket fermenter is opened and the hydrometer is used to check for an appropriately low sugar level and desired level of alcohol. Next, priming sugar is added to a bottling bucket, and the wort is poured into this bottling bucket without allowing aeration. Care is taken to see that the treppe (i.e., the residue and fermentation by-products in the bottom of the fermentation bucket) does not pour from the fermentation bucket into the bottling bucket. The wort and sugar are carefully stirred, and the bottling syphon is started. With the bottling siphon the sugar-primed wort is transferred to bottles, filling them from the bottom to the top—again to prevent aeration. Some bottling buckets have a spout to which a filling tube is connected, so this arrangement avoids the need to start a siphon. The wort is transferred in this case from the bottling bucket to the bottles by gravity. Next, the bottles are capped and aged. After five weeks or so, if everything was done properly, the home brewer hopes to have good tasty home-brewed beer. However, failures do occur.

In view of the mess and difficulties, excessive time and labor requirements, and frequent failures of traditional home beer brewing methods, attempts in the past have been made to ease the burden and improve the product. For example, a conventional home brewing apparatus is seen in WIPO publication WO 92/18606. This publication appears to depict and describe a product known in the commercial market as the "Beer Machine". Generally, this "beer machine" product seeks to achieve a closed, single-vessel brewing process which protects the fermentable product from oxidation and microbial contamination. Chemical sanitizing of the apparatus is still required. The "Beer Machine" also seeks to practice a cold/pressurized fermentation. This product requires pre-formulated mixes. Also, many of the traditional beer brewing processes are not possible with the "beer barrel". For example, hot-wort grain steeping is not possible with this product. Also, the addition of bittering hops or finishing hops at a particular time in the brewing process is not possible.

SUMMARY OF THE INVENTION

In view of the deficiencies of the related technology, a primary object for this invention is to avoid one or more of these deficiencies.

More particular, an object for this invention is to provide a home brewing method and apparatus which does not require the user to sanitize of sterilize the apparatus.

Another object for this invention is to provide a home brewing method and apparatus which requires considerably less labor than traditional home brewing.

Yet another object for this invention is to provide a home beer brewing method and apparatus allowing the user to produce differing brews by the selection of ingredients, and then to achieve the actual brewing by semi-automation of the process without the need for the user to personally carry out many of the process steps.

Still another object for this invention is to provide a home brewing method and apparatus that achieves the traditional process in a much less rigorous fashion for the user, while still allowing partial mashing (i.e., hot-wort grain steeping), addition of bittering hops, and of finishing hops, which uses traditional warm-working live yeasts, and ferments at ambient pressures.

Accordingly, the present invention provides a method of home-brewing beer, the method comprising steps of: making a wort of water, malt, and hops in a container; heating the wort to a temperature in the range from at least about 140° F. to 150° F. to as much as about 205° F. for an interval without ever boiling the wort; adding yeast; and fermenting the wort.

According to another aspect, the present invention provides a low-temperature, simplified, single-vessel method of home-brewing beer, the method comprising steps of: making a wort of water, malt, and hops in a container having a cover; heating the wort in the container to a temperature of at least about 140° to 150° F. to as much as about 205° F. for an interval without ever boiling the wort; adding yeast after the wort cools to a temperature of about 90° F. or cooler, and fermenting the wort for an interval in the container to produce alcohol while both protecting the wort from ambient microbes and allowing escape of fermentation gas by using a labyrinth seal between the container and the cover without using a fermentation lock.

Still another aspect of the present invention provides an automated machine for home-brewing beer, the machine comprising: a housing having a heater, a stirrer, and an ingredients dispenser; a removable brew pot receivable into cooperation with the housing in heat transfer relation with the heater for heating beer wort in the brew pot; a lid for covering the brew pot, the lid defining an aperture through which ingredients may be dispensed into the brew pot; the stirrer extending into the brew pot, and the housing having first power drive means in driving relation with the stirrer when the brew pot is in cooperation with the housing; the ingredients dispenser including plural ingredients containers, and second power drive means for driving the ingredients dispensing mechanism for dispensing ingredients from the ingredients containers into the brew pot; a programmable controller for controlling the heater, the first power drive means, and the second power drive means.

Advantages of the present invention derive from its combination, of simplicity of use, a low requirement for time and labor by the user, freedom from the need to sanitize the apparatus, use of a single brewing vessel, utilization of temperatures always below boiling, and reliable beer brewing results.

A better understanding of the present invention will be obtained from reading the following description of a single preferred exemplary embodiment of the present invention when taken in conjunction with the appended drawing Figures, in which the same features (or features analogous in structure or function) are indicated with the same reference numeral throughout the several views. It will be understood that the appended drawing Figures and description here following relate only to one or more exemplary preferred embodiments of the invention, and as such, are not to be taken as implying a limitation on the invention. No such limitation on the invention is implied, and none is to be inferred.

BRIEF DESCRIPTION OF THE DRAWING FIGURES

FIG. 1 provides a perspective view of a machine embodying the present invention for automated home brewing of beer;

Figure 4:
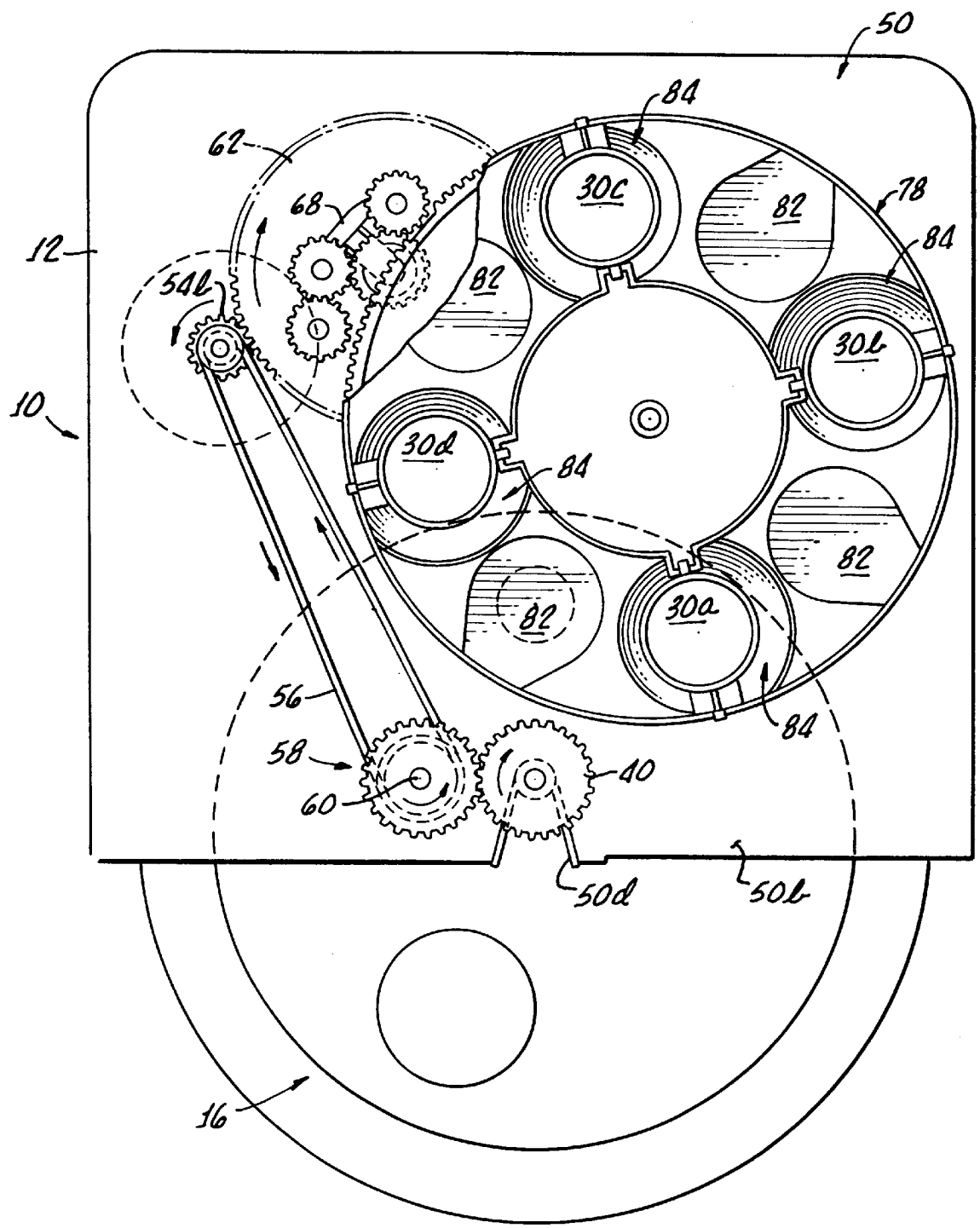
Figure 5:
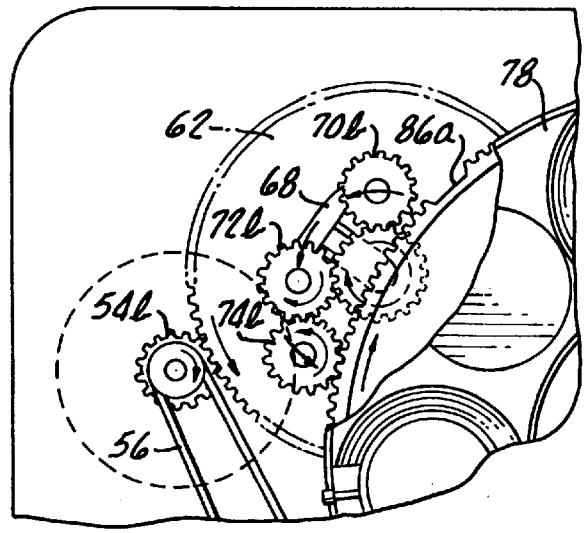
Figure 6:
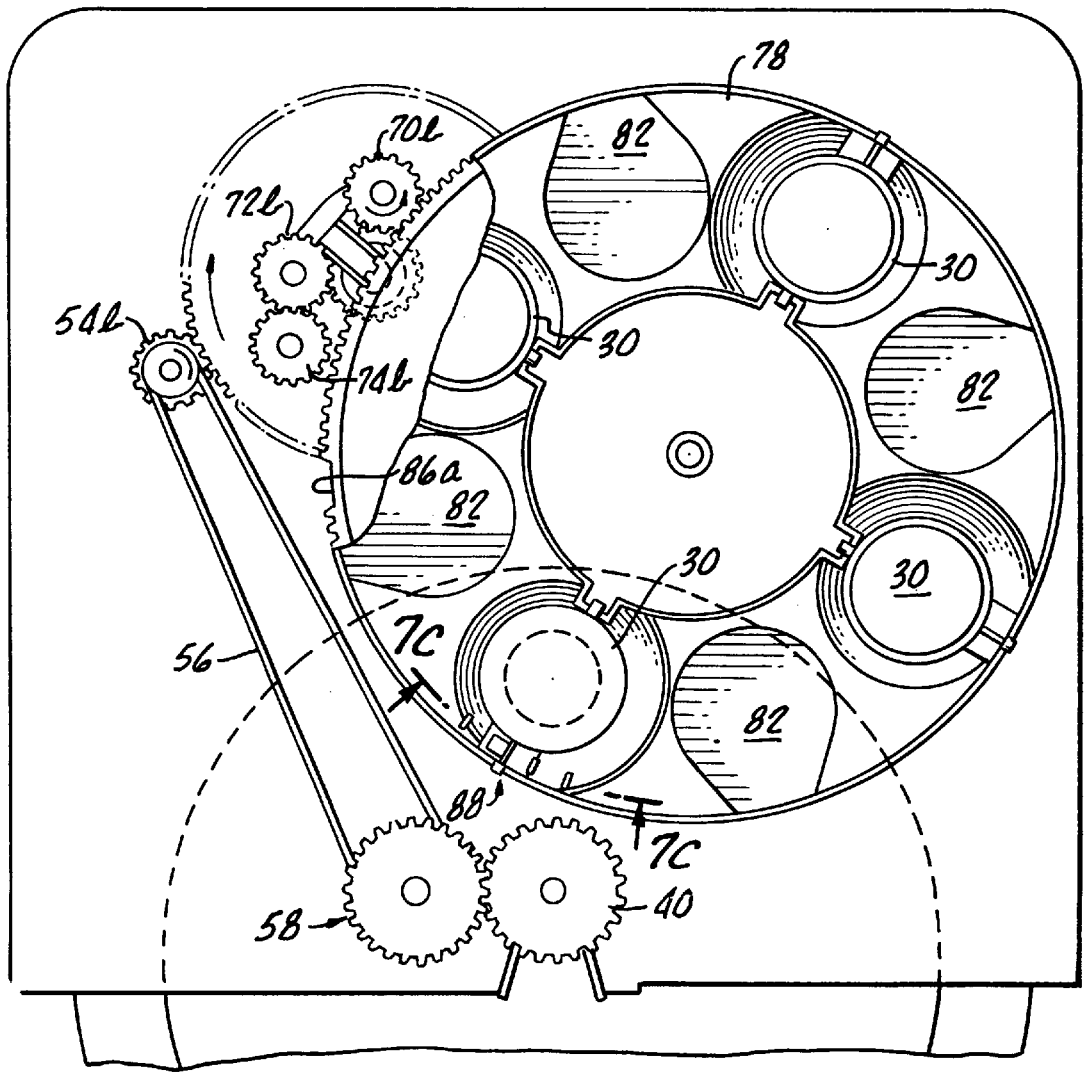
Figure 9:
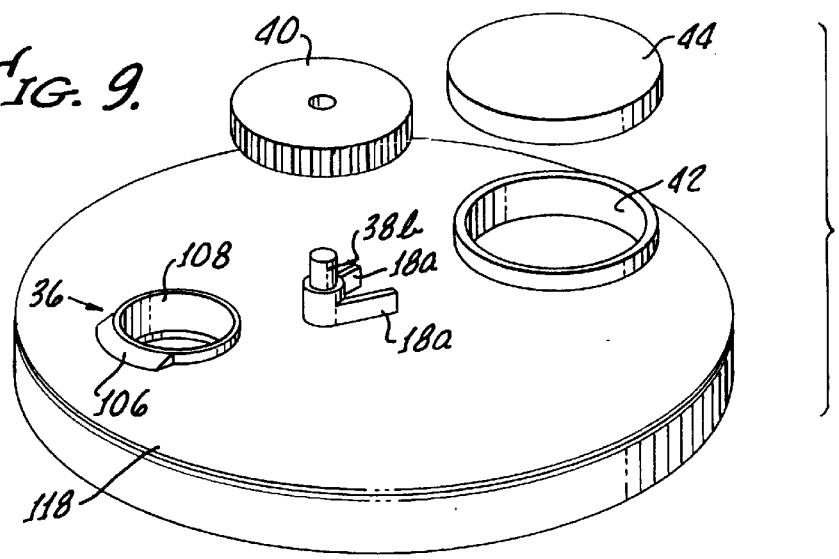
Figure 10:
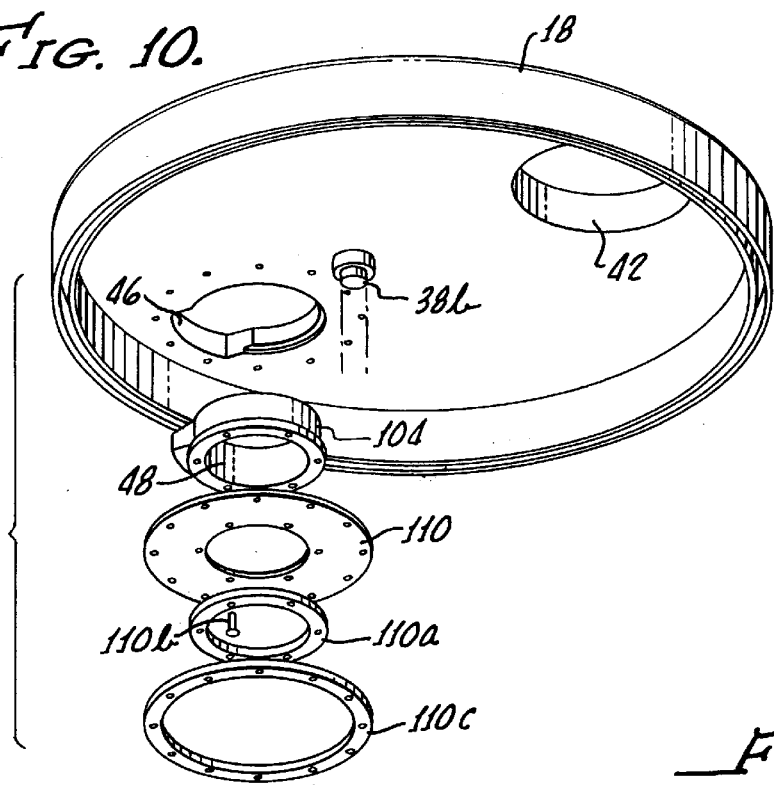
Figure 11:
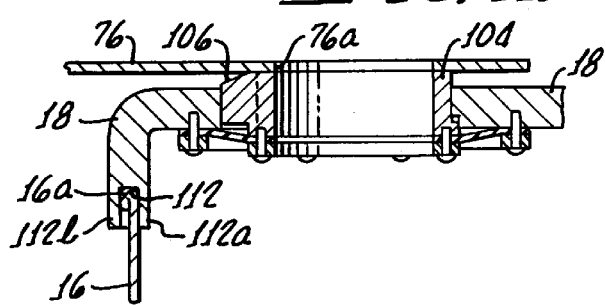
Figure 13:
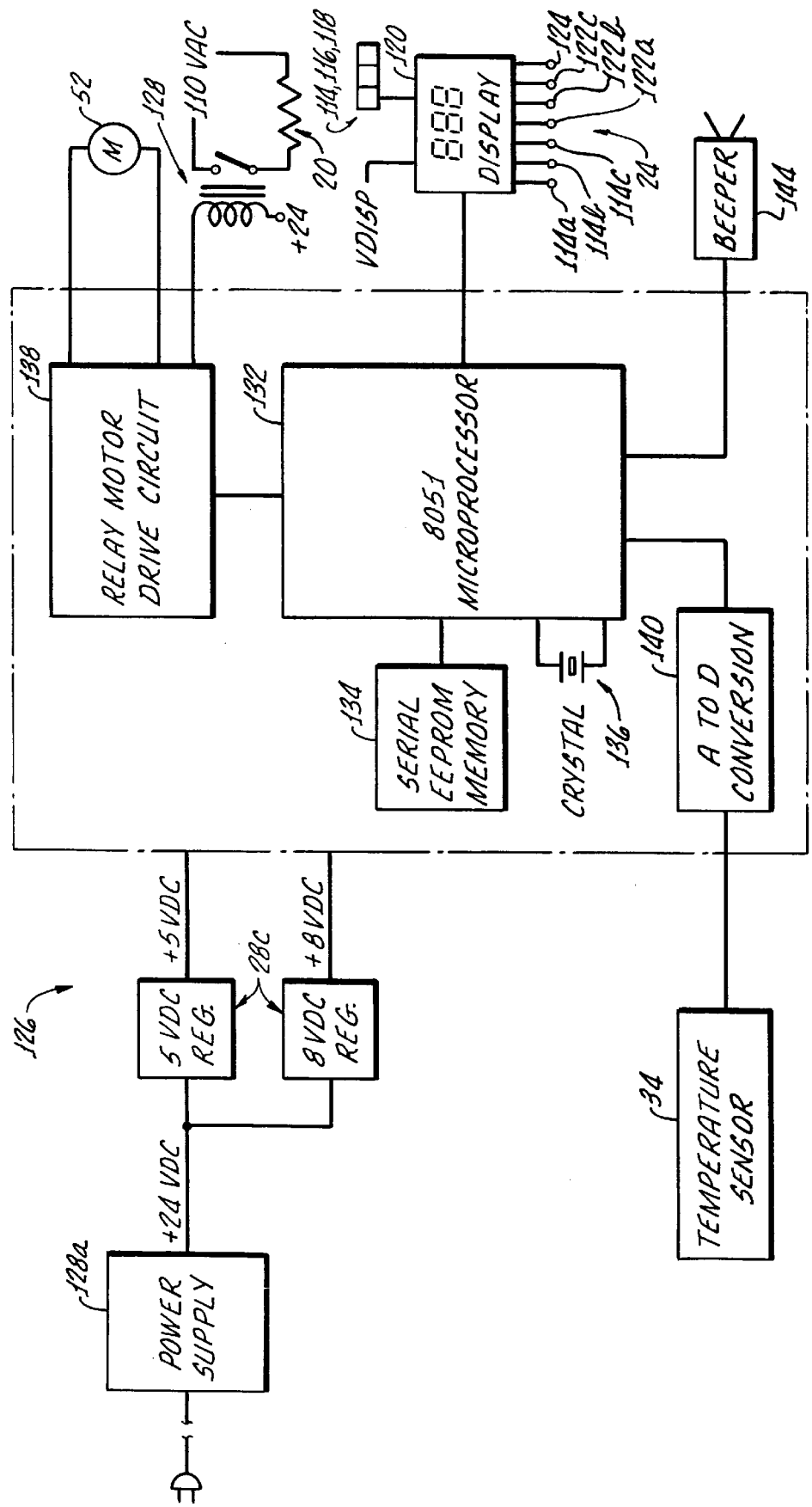
Figure 15A:
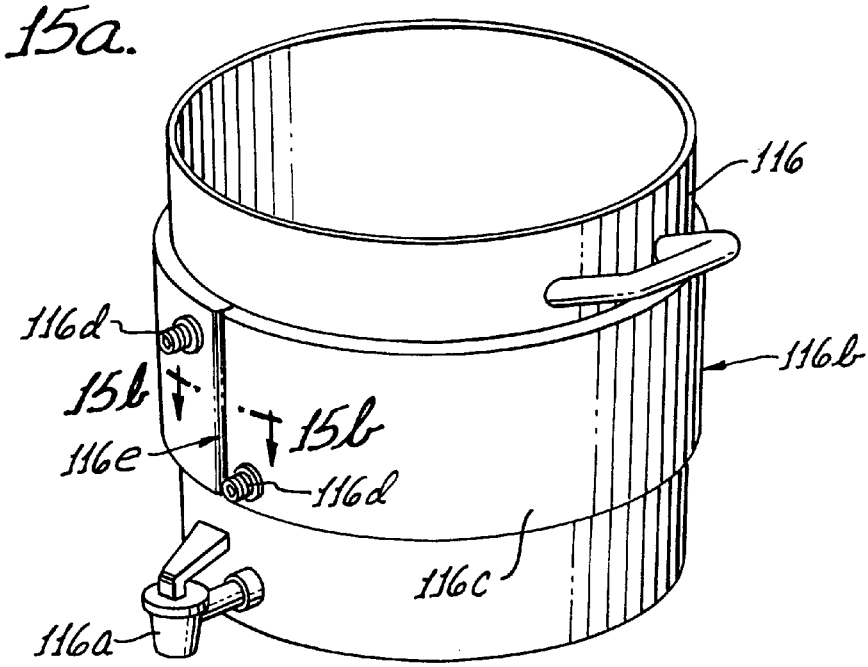
Figure 15B:
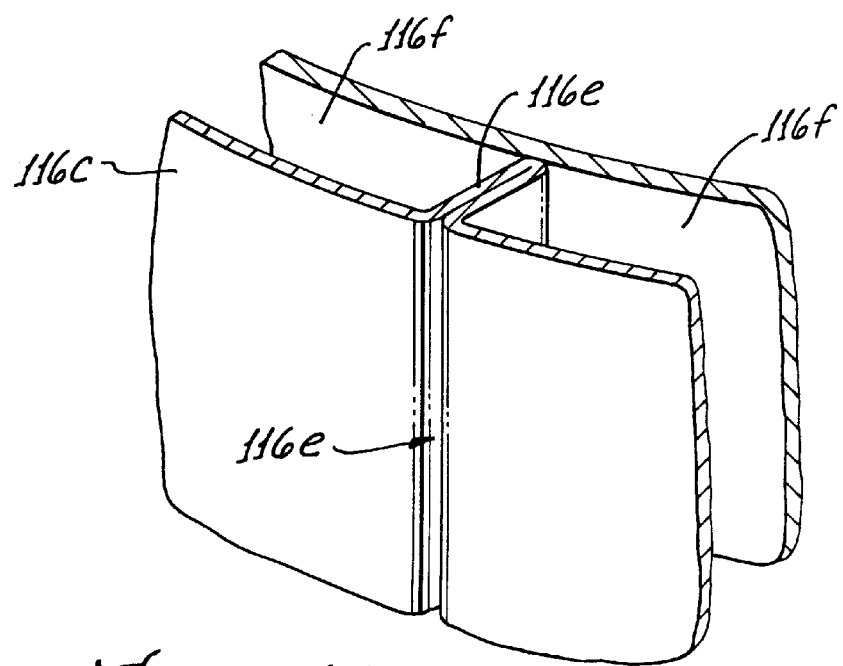

FIG. 4 provides a fragmentary depiction of a portion of the mechanism of the beer making machine, with operative parts in a particular operative position;

FIG. 5 shows the portion of the mechanism seen in FIG. 4, with the operative parts in alternative operative positions;

FIG. 6 shows a portion of the mechanism similar to that of FIGS. 4 and 5, but showing ingredient dispensing carried out during the beer brewing process;

FIGS. 7a–7e provide fragmentary sequential views showing dispensing of an ingredient from a cup of the machine;

FIG. 8 provides a view similar to those seen in FIGS. 7, but with a protective portion of the machine preventing entry of ambient dust and microbes into the beer wort;

FIGS. 9 and 10 provide perspective views of opposite sides of a lid used as part of the machine, with FIG. 10 providing an exploded assembly view;

FIG. 11 is a fragmentary cross sectional view showing a brew pot, and lid in cooperation with the remainder of the beer brewing machine;

FIG. 12 shows an enlarged detail view of a control panel of the machine;

FIG. 13 provides a schematic representation of an architecture for a microprocessor-based control system for the beer brewing machine;

FIGS. 14a through 14d provide flow charts of programming used to effect operations of the beer making machine;

FIG. 15a provides a perspective view of an alternative brew pot for use with the present machine and brewing process; and FIG. 15b provides an enlarged cross sectional perspective view of a portion of the alternative brew pot seen in FIG. 15a.

DETAILED DESCRIPTION OF AN EXEMPLARY PREFERRED EMBODIMENT OF THE INVENTION

Figure 1:
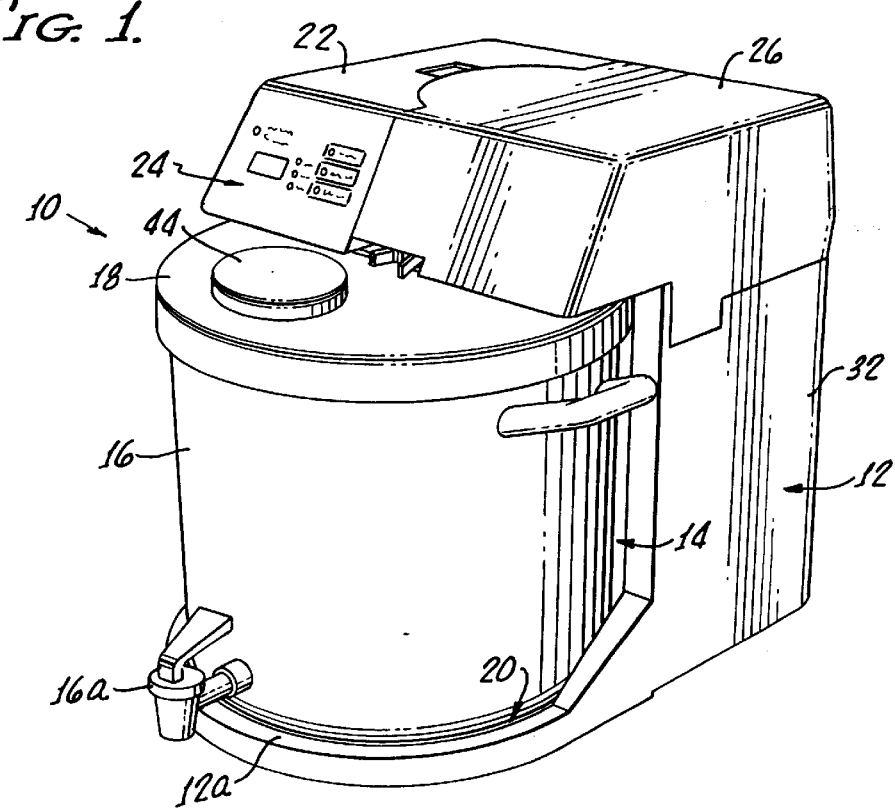
Figure 2:
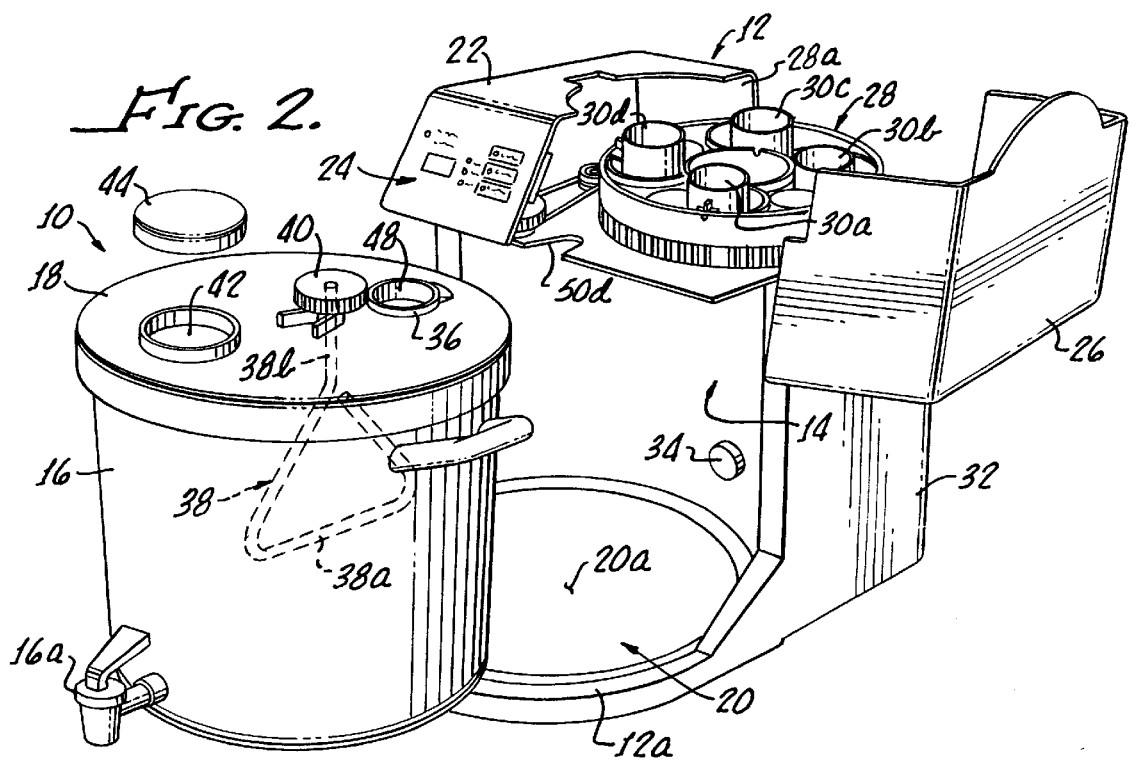
FIG. 2 is an exploded perspective view similar to FIG. 1 with a brew pot of the machine moved out of its recess in the housing, with a cover over an ingredient dispensing apparatus of the housing shown in its open position.

Viewing FIGS. 1 and 2 in conjunction, an automated machine 10 for use in home-brewing of beer is illustrated. Generally, the machine 10 includes a housing 12 providing a recess 14 into which a brew pot 16 with lid 18 is received. The brew pot 16 includes a spigot 16a. The recess 14 is defined between a hot-plate type of heater 20, having a heating surface 20a upon which the brew pot 16 sits, and an overhanging upper housing portion 22 having a control panel 24 and a hinged cover 26.

As seen in FIG. 2, the cover 26 may be hinged open to reveal a removable ingredients-dispensing turn table assembly 28 in a cavity 28a, the turn table assembly having in this case four ingredient cups 30a, 30b, 30c, and 30d (the "a,b,c,d" subscript indicating the order in which ingredients are dispensed from the cups 30, which is more fully explained below and illustrated in subsequent drawing Figures). The four ingredients cups 30 of the present embodiment are not limiting of the invention, and a smaller or larger number of ingredients cups can be provided to allow the machine to make various recipes of beer. When the cover 26 is closed, it provides a sufficient protection from ambient microbes for the ingredients in the cups 30, as well as preventing ambient dust from carrying microbes into the wort during dispensing of ingredients, as will be seen. Also as is seen in FIG. 2, a vertically extending intermediate portion 32 of the housing 12 carries a temperature sensor probe 34 which contacts the outer side surface 16a of brew pot 16 when this pot is seated upon heater surface 20a. In order to insure reliable temperature-sensing contact between the surface 16a and the sensor 34, the housing 12 includes a slightly elevated rim portion 12a circumscribing the heating surface 20a outwardly of the recess 14 and around the position of the pot 16 seen in FIG. 1 so that when the brew pot 16 is placed upon the heater 20 it nests into place and securely contacts the sensor probe 34.

Also as is seen in FIG. 2, the lid 18 for the brew pot 16 carries an apertured seal assembly 36 which sealingly cooperates with the upper portion 22 of the housing 12, as will be further explained. This lid also carries a rotational stirrer 38 having a lower portion 38a seen in FIG. 2, a shaft portion 38b journaled in the lid 18, and a pinion gear portion 40 (best seen in FIG. 2, and which will be further explained below. The lid 18 defines an opening 42 having a removable elastomeric cap 44. Apertured seal assembly 36 is fitted adjacent and into a key-hole shaped opening 46 (best seen in FIG. 10) in the lid 18, and defines a respective circular aperture 48 communicating vertically between the exterior of brew pot 16 and the interior of this pot.

Those ordinarily skilled in the pertinent arts will have an understanding of how beer is conventionally and traditionally home-brewed, and a summary of this art and some of the current art attached to it is set out above. However, the operation of the machine 10 differs so remarkably from the current art of home beer brewing that a presentation now of its operation will make understanding its structures and functions easier. Accordingly, it will be understood that the brew pot 16, lid 18, ingredients turn table 28 and cups 30 are all dishwasher safe. Thus, the user of the machine 10 can wash these items in an ordinary home dishwasher, or they can be washed in the sink with dish washing detergent. The user then places 2½ gallons of tap water in the brew pot, adds malt or malt extract, covers the brew pot with lid 18, and places this into recess 16. No sanitizing or sterilizing is necessary.

Next, the user places the turn table assembly 28 on the housing 12 (i.e., in recess 28a), adds hops and yeast to the appropriate cups 30, and places these cups in their locations in the turn table 28. The cups 30 and their correct locations on the turn table 28 are color coded or numbered, for example (not visible in the drawing Figures). Most preferably, the user will use an ingredients kit having similarly color coded or numbers ingredients packages, which both eliminated measuring of ingredients, and reduces the risk of improperly loading the ingredients into the machine 10. The cover 26 is closed, and the user starts the machine with simple inputs to control panel 24. With some brews, this is all that is required until 10 days later when the beer wort is ready to have priming sugar added and to then be bottled. In some cases, a hot-wort grain steeping operation will be conducted, which requires some attention from the user and utilization of opening 42 after removal of cap 44 as is described below. But, after grain steeping and replacement of the cap 44, the 10-day brewing interval passes, and the user then sugar-primes and bottles the beer for a subsequent carbonating fermentation.

During grain steeping, the machine will heat the wort to about 160° F., and maintain this temperature for about 20 minutes (or such other interval as the user may prefer) for the grain steeping operation. The user then starts the automated process, which will cook the wort and add hops and yeast. After the fermenting interval, when the user wants to sugar-prime the wort preparatory to bottling, the machine will conduct a stirring operation, as is further explained below.

During the brewing interval, the machine 10 adds the various hops, and yeast to the wort at the correct times and under acceptable temperature conditions, stirs the wort when necessary, and allows fermentation to proceed at ambient pressure while protecting the wort from microbial contamination. Heating the wort converts sugars and starches. Yeast fermentation at room temperature or cooler for "lagering" can be carried out. This alcohol-producing fermentation will have been completed by the time the brew interval of 10 days is passed (no fermentation water lock is needed, as will be explained), and sugar-priming and bottling of the beer can then be completed by the user of the machine 10.

Alternatively, if the user wishes, the brew pot can be removed from the machine, closed, and placed in a refrigerator to allow cold-working yeasts to be used in the fermentation. These yeasts may be termed "lager" yeasts, and produce a different beer product.

More particularly, the Applicants have discovered that the beer wort need never be boiled. Preferably, the wort is heated to a temperature in the range of at least about 140° to 150° F. to as much as about 205° F., but is not boiled. Because the temperature of the wort is never allowed to come to boiling, the user is free of any risk that the wort will boil over and make a mess to be cleaned up—which is always a risk and a frequent occurrence in traditional home beer brewing unless the brewer is constantly watching the stove and brew pot. In the case where the brewer may be at a sufficiently high elevation so that boiling takes place at a temperature sufficiently lower than 212° F. that the wort may boil at a temperature in the range from at least about 140° to 150° F. to as much as about 205° F., then the machine 10 may be reprogrammed by the user to employ a temperature still slightly below boiling. In such cases, the wort heating time interval can also be extended as necessary to compensate for the lower temperature.

Figure 3:
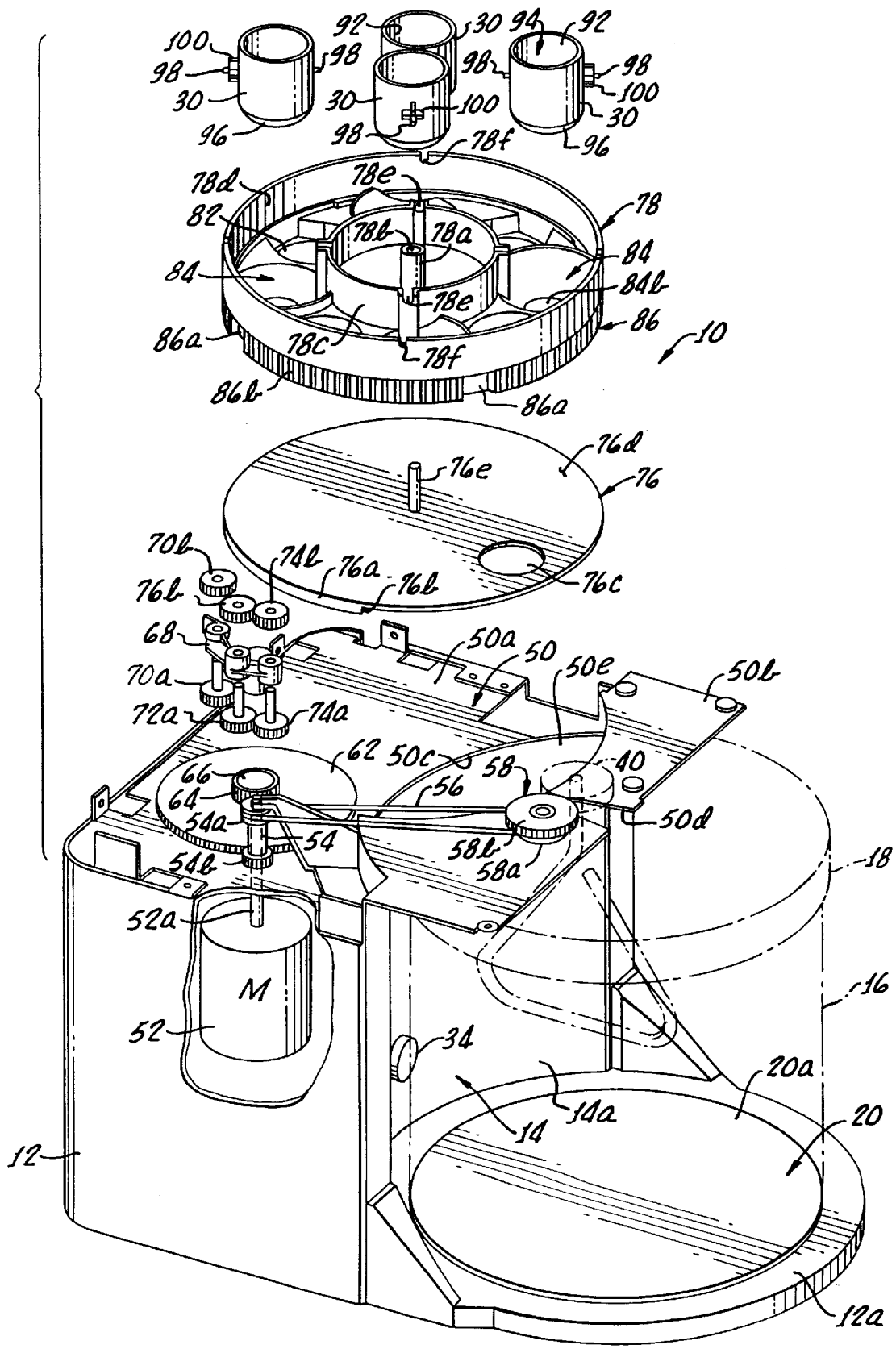
FIG. 3 is a fragmentary exploded perspective view of the beer making machine seen in FIGS. 1 and 2, and is shown with parts of the housing of the machine removed or broken away for improved clarity of illustration.

Considering now FIG. 3, a fragmentary view of the machine 10 is shown. It is seen that the housing 12 includes a stepped machinery deck 50, which is exposed in FIG. 3 for clarity of illustration. The cover 26 opens over a part of this machinery deck, as is apparent from viewing FIGS. 1 and 2. The remainder of the machinery deck 50 is ordinarily covered over by the upper portion 22 of housing 12. The deck 50 includes a lower portion 50*a* and an upper portion 50*b*, with an arcuate transition 50*c* between these portions being shaped congruently with a portion of the brew pot 16 and in alignment with a rear wall 14*a* of the recess 14. At its forward edge over the recess 14, the upper portion 50*b* of machinery deck 50 defines a V-shaped slot 50*d* receiving the stirrer 38 and pinion gear 40 of the lid 18, as will be further explained between the upper portion 50*b* and portion 50*a*, the deck 50 defines an elliptical aperture 50*e* (which is closed by the member 76 to be introduced below) and by which ingredients will be dispensed into the brew pot 16.

Secured to the underside of the machinery deck 50 is a reversible motor 52 having a vertically extending motor shaft 52*a* extending vertically above the machinery deck 50. Secured drivingly to the motor shaft 52*a* is an elongate drive member 54. At its upper extent, the drive member 54 defines a timing belt sprocket 54*a*, and at its lower extent the member 54 defines a pinion gear 54*b*. A toothed timing belt 56 is trained about the sprocket 54*a* and extends to and around a sprocket/drive gear member 58. This sprocket/drive gear member includes a sprocket portion 58*b* receiving the belt 56, and a drive gear portion 58*b* which is drivingly engageable by the pinion gear 40. The machinery deck 50 includes a vertically extending stem 60 (best seen in FIG. 4) upon which the sprocket/drive gear member 58 is journaled, still viewing FIG. 3.

Another vertically extending stem (not seen in the drawing Figures) defined by and extending from machinery deck 50 journals a comparatively large drive gear 62. This drive gear 62 meshes with pinion gear 54*b*, and has an upstanding hub gear 64 defining a central recess 66. Received into the central recess 66 and upon a portion of the stem (not seen in the drawing Figures) journaling gear 62 is a toggle member 68. The toggle member 68 defines three vertically extending through bores (not individually referenced in the drawing Figures). In each of these bores is respectively received one of three rotational shafts 70, 72, and 74. At opposite end portions each of these shafts 70–74 drivingly carries a pair of pinion gears indicated with the numerals 70*a* and 70*b*, 72*a* and 72*b*, 74*a* and 74*b* (i.e, a pair of pinion gears on each of shafts 70, 72, and 74 respectively). Pinion gears 70*a* and 72*a* each mesh with hub gear 64. Gears 72*a* and 74*a* are meshed with each other, as are gears 72*b* and 74*b*. Gears 74*a* and 74*b* do not mesh with hub gear 64.

Further considering FIG. 3, it is seen that above the drive gear 62, the machinery deck 50 carries a circular plate-like dispensing base member 76. This base member 76 has a depending skirt section 76*a* which extends about slightly more than 180° of the base member, and which is interrupted between two locations 76*b* (only one of which is visible in the drawing Figures), to provide a fit of this plate-like member to the arcuate step 50*c* in deck 50. The base member 76 defines a circular aperture 76*c*, which overlies and aligns with aperture 50*e*. Also, the base member 76 defines a flat plate-like upper surface 76*d*, the function of which will be seen. The base member 76 centrally includes a vertically upwardly extending stem 76*e* upon which is removably journaled a dispensing turn table 78 of the assembly 28.

The dispensing turn table 78 includes a central boss 78*a* defining a bore 78*b* into which is received the stem 76*e* of base member 76. Circumferentially arrayed about this boss are a pair of radially spaced apart circumferential walls 78*c* and 78*d*, each notched at four radially aligned locations 78*e* and 78*f* to support ingredient dispensing cups 30. Considering now FIG. 4 in conjunction with FIG. 3, it is seen that radially between the walls 78*c* and 78*d*, the turn table member 78 includes four circular cover portions 82 alternating with four dispensing recesses 84 (both best seen in FIG. 4). Each dispensing recess 84 includes a funnel-shaped conical wall section 84*a* leading downwardly to a respective dispensing aperture 84*b* (seen also in FIGS. 7). The notches 78*e* and 78*f* are radially aligned with the dispensing recesses, and the cups 30 are received pivotally in the notches above these locations and the apertures 84*b*, respectively.

In order to effect incremental circular motion of the turn table 78, below the outer wall 78*d* the turn table member 78 includes a circumferentially extending gear section 86. The gear section 86 is not circumferentially continuous, but is interrupted at four locations spaced 90° apart to define notches, each indicated with the numeral 86*a* (only two of which are visible in FIG. 3). As a result, gear segments 86*b* extend circumferentially from one notch 86*a* to the next. As is seen in FIG. 4, when the motor 52 is operated to turn drive gear 62 in a clockwise direction, the toggle member 68 also pivots clockwise, and pinion 70*b* is pivoted toward engagement with the gear section 86. The direction of rotation of pinion 70*b* is such that it would rotate the turn table member 78 in the clockwise direction. However, in the rotational position of the turn table member 78 seen in FIG. 4, the pinion 70*b* aligns with and is received into one of the notches 86*a*. Consequently, operation of the motor 52 can not turn table member 78, but does result in rotation of stirrer 38 via the belt 56, sprocket/gear 58, and engagement of the gear portion of the sprocket/gear 58 with the gear 40 on shaft portion 38*b* of the stirrer 38 (as is seen in FIG. 4).

On the other hand, viewing now FIG. 5, when motor 52 is operated in the reverse direction to turn gear 62 in the counter clockwise direction, then toggle member 68 also pivots counter clockwise, and pivots pinion 74*b* toward engagement with the gear segment 86*b* to the right (i.e., counter clockwise) of the notch 86*a* into which the pinion 70*b* had been received. The pinion 74*b* engages into the gear segment 86*b*, but is rotating in the direction to also turn the turn table member 78 in the clockwise direction. This is the case because the pinion 72*a* is engaged with hub gear 64, and is also meshed with the pinion 74*a*. The shafts to which these pinions are attached also carry meshed pinions 72*b* and 74*b*, with the result being that the pinions 72*a* and 72*b* serve as reversing gears. An interval of operation of the motor 52 in the reverse direction is enough to rotate turn table 78 in the clockwise direction so that a notch 86*a* no longer aligns with pinion 70*a*. Consequently, after this interval of operation in the reverse direction, the motor 52 is stopped, and then operated in the forward direction for an interval, as will be explained.

Viewing now FIG. 6, it is seen that once again as the motor operates in the forward direction, the toggle member 68 pivots, this time in a clockwise direction pivoting pinion gear 70a toward engagement with a gear segment 86b. However, in this case after the preceding interval of reverse operation of the motor, the notch 86a not longer aligns with the pinion 70a, and this pinion engages the gear segment 86b to turn the turn table 86 in the clockwise direction. This rotation of turn table member 78 will continue so long as the motor operates, or until the next notch 86a comes into alignment with the pinion 70b. The motor 52 is operated for a sufficiently long time to insure that the turn table 78 is turned through 90 degrees. However, the turn table 78 can not be turned further than 90 degrees during any one operation of the motor 52 in the forward direction because the next notch 86a will move rotationally into alignment with the pinion 70a, and the turn table member 78 will then stop in this rotational position. FIG. 6 shows the next sequential notch 86a approaching the pinion 70b. When this notch 86a reaches the pinion 70b, the turn table member 78 will stop because of its own frictional engagement with the member 76. In other words, the turn table member 78 will have achieved the same position seen in FIG. 3, except that it is now indexed 90° clockwise.

FIGS. 7 show what happens at one of the cups 30 as the turn table 78 is rotated 90 degrees clockwise. During this incremental rotation of the turn table member 78, one of the cups 30 will pass over dispensing aperture 76c. In order to effect dispensing of the contents of this cup as it passes over the aperture 76c, the cover 26 carries on its underside an arcuate gear rack section 88. Attention now in more particularity to the cups 30 as illustrated in FIG. 3 will show that they include a side wall 90 defining an upper opening 92 leading to an internal recess 94 which is closed at its lower end by an end wall 96. The side wall carries a pair of diametrically opposed pintle pins 98 of differing diameter, and one of which is associated with four radially extending fins 100 arrayed at 90° relative to one another. These fins 100 are equivalent to gear teeth, as will be seen. The gear-fins 100 are associated with the pintle pin 98 which faces radially outwardly on the turn table member 78 and toward the gear rack section 88. The notches 78e and 78f are different sizes also, and the pins 98 match these notches so that the cups 30 will sit on turn table member 78 in only one orientation (i.e., with the gear-fins 100 facing radially outwardly). The fins 100 will be seen to function as gear teeth in cooperation with the rack section 88.

The sequence of positions for a cup 30 seen in FIGS. 7a–7e depict the positions of a cup 30 as it passes under the arcuate gear rack section 88 and as the fins 100 engage between the teeth of this gear rack. The rotational position of the gear rack section 88 on cover member 26 is such that the cup 30 achieves inversion and dispensing of its content of ingredient for beer wort into the recess 84 just at this recess and the aperture 84b passes over the aperture 76c. The raised position of wall portion 84a serves to substantially prevent ingredients from the cups being spilled in other locations besides the recesses 84 below each cup 30. In other words, as each cup 30 flips over to spill its contents, the contents are caught by the walls 84a, in the particular recess 84, and drop toward aperture 84b. The aperture 84b aligns at this time with apertures 76c, as well as with aperture 48 in seal assembly 36, leading into the brew pot 16 and the beer wort being made therein.

Consequently, the ingredient contents of the cups 30 are sequentially dispensed and stirred into the brew pot 16 by preparatory reverse operation of the motor 52 followed by an interval of forward motor operation as explained above. When the ingredients from each cup 30 are dispensed into the brew pot, a sufficient barrier between the wort and ambient is still maintained even though the apertures 48, 76c, and 84b leading to the wort are generally aligned and open to allow the ingredients to fall into the wort. This is the case because cover 26 remains closed, and ambient dust which might carry microbes into the wort, for example, is sufficiently excluded. Also, even if the home brewer or another person happens to be at the machine 10 while ingredients are being dispensed, their breath will not carry microbes into the wort.

After the ingredient contents of each cup 30 are dispensed into the brew pot, the next sequential cover portion 82 comes into alignment with the dispensing recess 76c, and the turntable member 76 stops in this position because a notch 86a comes into alignment with the pinion 70b, as is seen in FIG. 8. This protective function for excluding ambient dust and microbes from the wort occurs regardless of how long motor 52 is operated in its forward direction. That is, the turn table member 76 is only advanced by 90 degrees, and the contents of one cup 30 are dispensed into the brew pot, after which the aperture 76c is again closed by a cover portion 82. On each dispensing occasion, the motor is operated for a sufficiently long time in the forward direction to insure that the turn table 78 reaches its next position with a notch 86a aligned with pinion 70b. Operation of the motor 52 in either direction operates the stirrer 38, and continued operation of the motor after ingredients are dispensed from a cup 30 into the brew pot 16 serves to stir these ingredients into the wort. Preferably, the cups 30 and each of their corresponding locations on the turn table 78 are color coded or numbered so that ingredients are placed by the user into the correct cup for brewing, and are dispensed in the correct sequence into the brew pot.

Attention now to FIGS. 9 and 10 will show sealing structures of the brew pot 16 and lid 18, and cooperation of these structures with the housing 12 to effect brewing without contamination by ambient microbes, and without the need for a water-filled or any other type of fermentation lock. Considering FIG. 9, it is seen that the lid 18 defines a key-hole shaped opening 46. The seal assembly 36 includes an elastomeric sealing member 104 movably received into this opening 46, and includes an upper ramp-shaped section 106 exposed on the upper side of lid 18. The elastomeric member 104 (when the brew pot 16 and lid 18 are inserted into recess 14) is sealingly engageable at a circumferentially continuous end surface 108 with the underside of deck 50 below the dispensing plate 76. In order to provide for resilient compliant movement of the sealing member 104 at ramp section 106 and sealing end surface 108 as the brew pot 16 with lid 18 is inserted into or removed from recess 14, the member 104 includes or is associated with an elastomeric diaphragm 110. In this case, the member 104 and diaphragm 110 are joined by a fastener ring 110a, but this need not be the case. A multitude of small fasteners 110b secure the ring 110a to diaphragm 110 and member 104, but only one of these is illustrated in FIG. 9. On the other hand, the member 104 and diaphragm 110 may be formed in a single piece. The radially outer circumferential portion of diaphragm 110 is joined sealingly to lid 18 using a second fastener ring 110c and fasteners 110d (again, only one of these fasteners being shown in the drawing Figure).

FIG. 9 also illustrates that the lid 18 includes a pair of angulated wings 18a, one on each side of and forming a part of a boss through which passes the shaft 38b of the stirrer 38. These wings 18a are mutually angulated to match the notch 50e in part 50b of the machinery deck 50 so that when the brew pot 16 with lid 18 is placed by a user into recess 14, the gear 40 is guided into meshing engagement with gear section 58b, and the lid 18 is guided also into its proper position of relative rotation so that the aperture 48 in seal assembly 36 is aligned with the aperture 76c in the dispensing base member 76 (viewing also FIGS. 1, 2, and 3). Thus, ingredients dispensed from the cups 30 fall right into the brew pot 16. The seal assembly 36 sealingly engages the underside of the plate-like dispensing base member 76 as the brew pot and lid are slid into the recess 14, so that ambient dust and microbes are sealed out of the beer wort at this interface.

FIG. 11 shows a cross section of the lid 18 received on brew pot 16. As is seen, the brew pot 16 includes an ordinary rolled upper edge 16a. Lid 18 defines a circumferentially extending groove 112 defined between radially inner and radially outer skirts 112a and 112b, respectively. The groove 112 receives the upper edge or lip 16a, and cooperatively defines a labyrinth seal configuration. No gasket or other positive-contact type of seal is required between the brew pot 16 and lid 18. During brewing of beer in pot 16, as the contents of the pot are heated and cooled, there will be expansion and contraction both of the liquid contents of the pot, and (more importantly) of the gaseous contents of this pot. Consequently, the pot will respire or breath via the interface of lid 18 and lip 16a (i.e., at groove 112). As gas flows outwardly of this interface, there is no risk of ambient microbes coming into the wort. However, when the pot 16 is cooled or otherwise has a lower than ambient pressure (i.e., ambient barometric pressure may also vary during brewing, for example), incoming air might be carry ambient microbes into the wort. However, this has been found to not be the case. In fact, the labyrinth seal defined between lip 16a and groove 112 has been found to be sufficient to prevent introduction of ambient microbes into the beer wort. Consequently, the brew pot 16 needs no water-filled or other fermentation lock, and gaskets and seals which might harbor microbes in crevices to be carried into a subsequent batch of wort are not used or required. Cleaning of the brew pot and lid are substantially easier as a result than any prior home brewing apparatus known.

Attention now to FIGS. 12, 13, and FIG. 14 will explain how the machine 10 is used to brew beer with very little labor or time from the user being required. As is seen in FIGS. 1 and 2, and is more particularly shown in FIG. 12, the machine 10 includes a control panel 24. This control panel 24 includes (in the present embodiment) three push-buttons 114, 116, and 118, each with a corresponding LED indicator 114a, 116a, and 118a. The control panel 24 also includes a three-character alpha/numeric LCD display 120, and three LED indicators 122a, 122b, and 122c, each providing (when individually illuminated) a guide to the value being displayed on this display 120. Finally, an indicator 124 provides by its illumination (or lack of illumination, respectively) an indication of whether the temperature sensor probe 34 is sensing an increasing or decreasing temperature at the brew pot 16 (i.e., heating or cooling of the beer wort in the pot 16).

FIG. 13 shows the architecture for a microprocessor-based control system 126 interfaced with heater 20, with control panel 24, with sensor 34, and with motor 52. The control system 126 includes a power supply section 128 having a transformer section 128a receiving line power via a line cord 128b, and a pair of regulated power supply modules 128c, each providing respective low-voltage supplies for integrated circuits or low-voltage controls. The line cord power is also provided to a relay 128d for the heater 20. The power voltages from modules 128c are supplied into a programmable logic section 130 which includes a microprocessor 132 and serial EEPROM 134. A crystal oscillator 136 provides a clock rate for the microprocessor, allowing an internal clock to keep real time. In order to control the motor 52, the control system 126 includes a motor control relay/drive circuit 138. This circuit 138 may actually include a relay, or may be all solid state, as desired. An A-to-D converter 140 provides for input of the sensed temperature value from probe 34. A I/O data buss 142 provides two-way interface with the display 120, push buttons 114, 116, 118, and indicators 114a, 116a, 118a, 122, and 124. An audio beeper output 144 provides for the machine to signal a user when the beer is finished brewing, or when attention is needed for addition of steeping grain or priming sugar, for example.

FIGS. 14 provide exemplary and illustrative flow charts of the programming for microprocessor 132, stored in memory 134, which allows the user of the machine 10 to brew many varieties of home-brew beer simply by loading the ingredients into the appropriate cups 30 and starting the machine 10. This programming is probably best understood in the context of an explanation of use of the machine in brewing beer, so the explanation below serves both purposes.

Recalling the structure and function of the machine 10, and considering the programming diagrammatically depicted in FIGS. 14, it is to be understood that the brew pot 16 is first filled with 2½ gallons of tap water, malt is added, the pot is covered with lid 18 and placed into recess 16. Next, the first hops, second hops, third hops, and yeast are placed into the appropriate ones of cups 30 on turn table 78, with the turn table indexed to its starting rotational position, and cover 26 is closed. The machine 10 is started by selecting on display 20 the appropriate program for the beer recipe being used. FIG. 14a shows the programming steps for an exemplary one of the recipes.

Figure 14A:
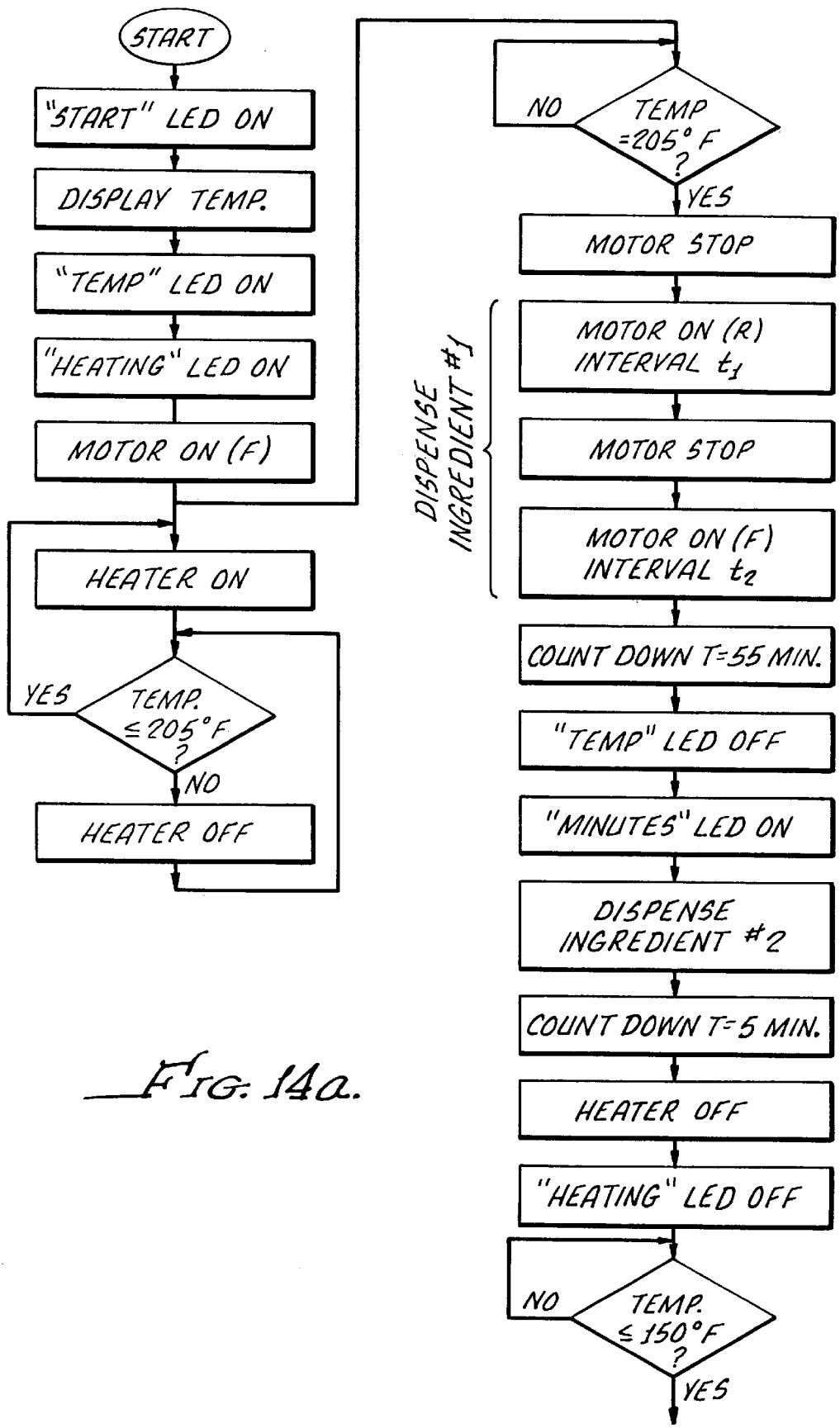
Figure 14B:
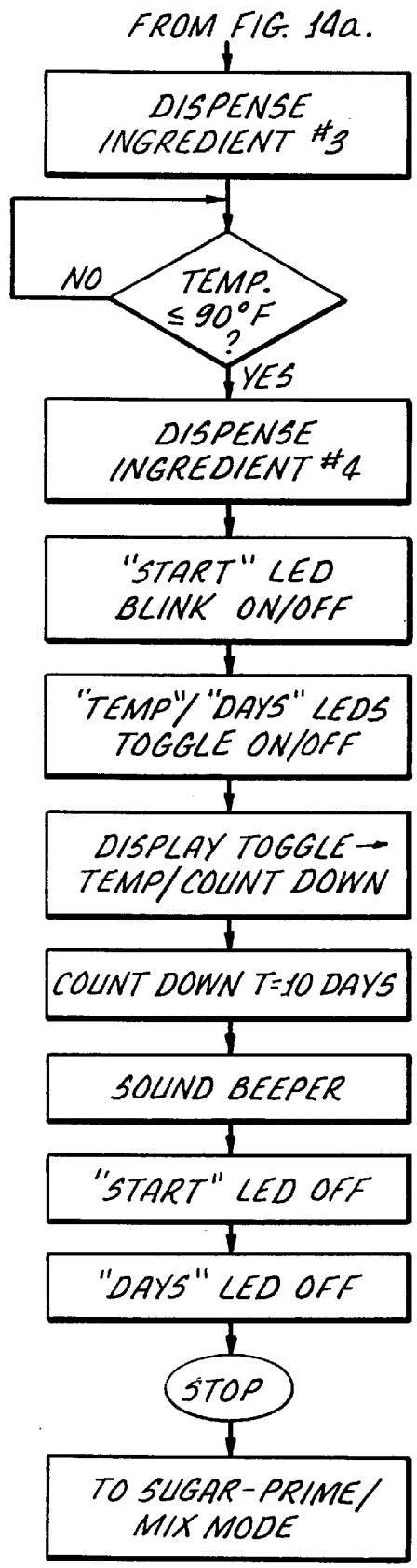
Figure 14D:
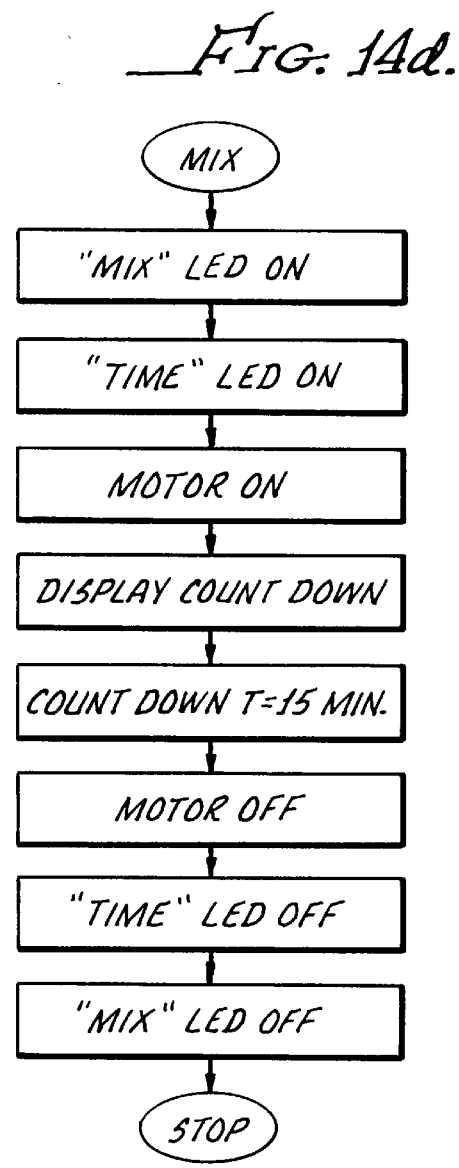
Figure 14C:
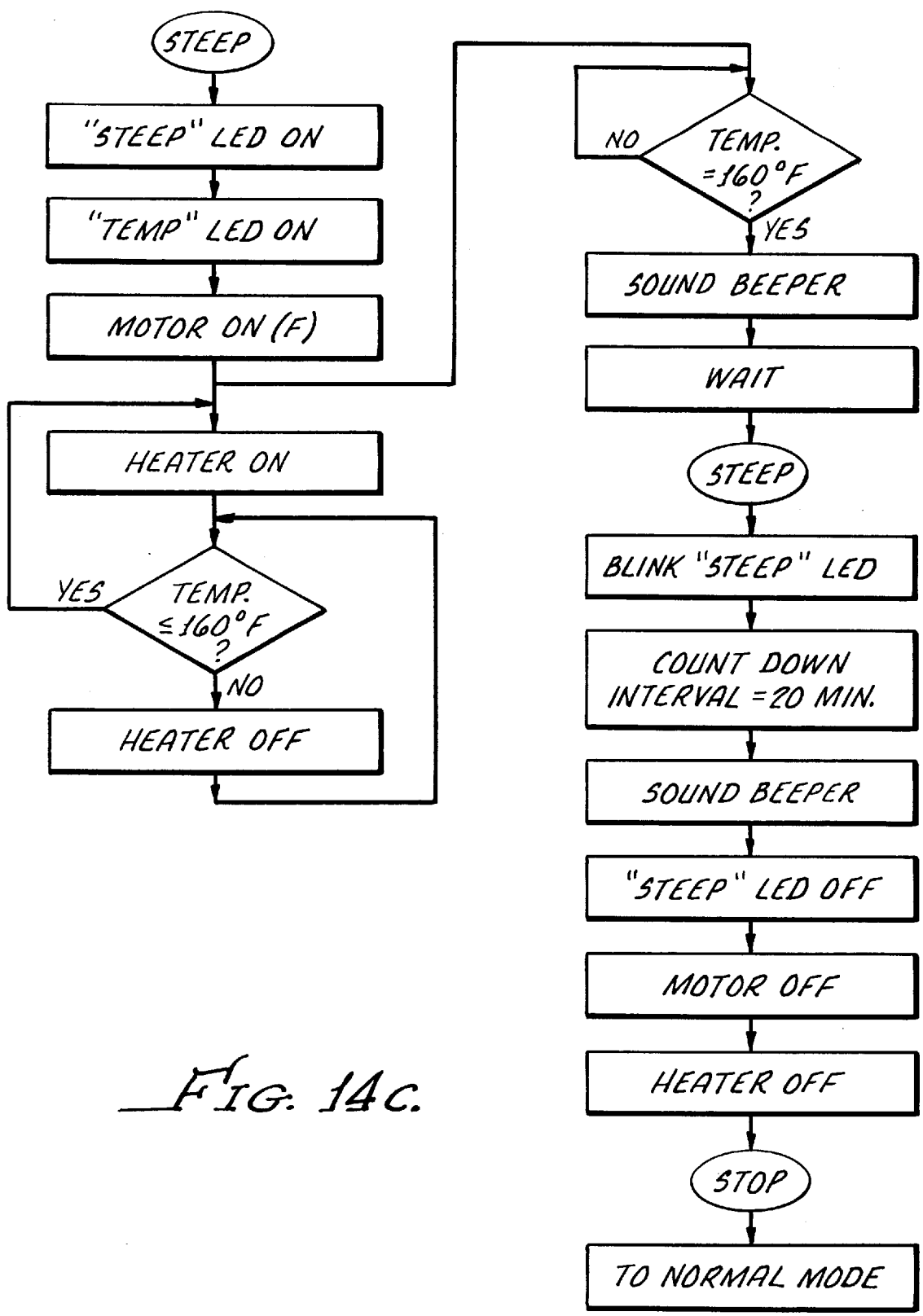

However, if the recipe calls for grain steeping, the programming flow chart for this option is shown in FIG. 14c, and the user will be summoned by the machine to steep the grain bag after the water has been brought to an appropriate temperature (i.e., about 160° F.). In general, the grain steeping operation involves filling the brew pot with water, filling a grain bag and placing this bag in the brew pot. The user presses, "Steep", which causes the machine implement the program shown in FIG. 14c. When the machine is done, it summons the user to remove the grain bag, add the malt, and press, "Start", upon which the machine proceeds with the rest of the brewing process. FIG. 14c shows the program for a preparatory grain steeping, and is self explanatory. When the water has been heated to a steeping temperature, the machine 10 summons the user, the user presses the "Steep" button again to let the machine know that the grain bag is immersed in the brew pot. In this instance, after a 20 minute grain steeping with the stirrer 38 operating, the machine again summons the user to remove the grain bag. After the grain bag is removed, the user adds cap 44, and then presses "Start" to proceed with the usual brewing sequence. The grain steeping interval is pre-programmed, but is changeable by the user. FIG. 14c shows a 20 minute steeping interval only for purposes of illustration.

Again, after the grain steeping (if used), the machine signals the user, the user presses "Start" and the brewing process continues (referring now to FIG. 14a and 14b). Some recipes will not call for a grain steeping step, so consideration now of FIGS. 14a and 14b in greater detail will explain the normal mode of machine operation. Importantly, the wort is never boiled. That is, the applicants have discovered that a temperature of at least about 140° F.

to 150° F. or higher, and most preferably as high as about 205° F., but not full boiling, is sufficient to kill undesirable microbes, to successfully extract the flavors and essences from the malt and hops, and to properly brew beer. Use of this temperature always below boiling avoids the risk of the wort being boiled over.

Further, to contrast the traditional brewing methods, when the wort is to be cooled to allow yeast addition without killing the yeast by adding it to an overly-hot wort, no wort chiller or ice packing of the brew pot is required. Although no wort chiller is required, one may be used by the home brewer who wants to move the brewing process along more quickly. An alternative embodiment of the invention to be described below will be seen to provide for this option of actively chilling the wort. Active chilling of the wort does not effect the process so far as controller 126 is concerned because the process is under temperature control for the addition of the yeast. Other aspects of the process are under time control, but these will simply be adjusted automatically when the wort is chilled and takes a shorter time to cool to a temperature allowing the yeast to be added.

Again, in contrast, the conventional art of home beer making tells us that the wort must be chilled quickly and then placed with yeast into a fermentation bucket with a water-filled fermentation lock. The brewer is traditionally cautioned against breathing on the wort. This traditionally was thought to be the case no doubt because the handling of the wort by the human brewer and the exposure to ambient air combined to allow microbes to enter the wort. With traditional home brewing methods, spoiled beer resulted. However, the wort is in this case not exposed to the human brewer (i.e., the human brewer is not going to be breathing on the wort and possibly exhaling microbes into the wort), nor is the brew pot opened to ambient at this stage. The wort may be allowed to cool at a natural heat loss rate to ambient, with the temperature being sensed by probe 34 and with the brew pot kept closed. When the wort has achieved a sufficiently low temperature, the control system 126, will actuate the turn table 78 to dispense the yeast from its cup 30 into the brew pot 16.

Returning to a further consideration of FIGS. 14*a* and 14*b*, these Figures show that after the user starts the machine, the heater 20 is controlled to a temperature never allowing boiling of the wort, and the ingredients are dispensed from the cups 30 at timed intervals and stirred into the wort. In FIGS. 14*a*, "motor on (f)", means that the motor is operated in its forward direction. As explained above, this forward operation of the motor only stirs the wort unless a preparatory reversing interval of motor operation is required. These preparatory reverse motor operations are indicated with "motor on (r)", and the time interval "$t_1$," is preferably about 1½ second. After a preparatory reverse motor operation, the motor is operated in its forward direction to both dispense ingredients from one of the cups 30, and to stir these ingredients into the wort simultaneously with their being dispensed and afterwards. All of the steps for the first one of these ingredient dispensing operations are fully set out in FIG. 14*a*, but after this first time the steps are indicated with single "dispense ingredients" activity boxes on the flow chart. After the dispensing of the ingredients from a cup 30, continued operation of the motor in the forward direction serves to further stir the wort with the ingredients just added. It will be noted again that the stirrer 38 does not extend to the bottom of the pot 16, so stirring the wort does not significantly disturb sediment collected at the bottom of this pot.

At the end of the alcohol-producing fermentation interval, the yeast will be dormant because all of the fermentable sugars of the wort have been consumed. At this time, the controller 126 will summon the user to add priming sugar to the wort. This priming sugar will be stirred in using stirrer 38, which importantly does not reach to the bottom of the brew pot 16. That is, the stirrer 38 is spaced sufficiently above the bottom of brew pot 16, and above the residue of fermentation products which collects there, that operation of this stirrer 38 does not significantly disturb the residue. Sugar-priming the wort in the pot 16 and stirring it in this pot promotes uniform mixture of the sugar to insure consistency in carbonation from bottle to bottle.

FIG. 14*d* provides the flow chart for this sugar-priming operation of the machine 10. After the wort is sugar-primed, it needs to be transferred into beer bottles to be capped and bottle-conditioned. This "bottle conditioning" means that a second carbonation-producing fermentation is carried out in the pressure vessels of the capped beer bottles. For this purpose, and importantly, the spigot 16*a* is spaced sufficiently above the bottom of brew pot 16 that the wort can be dispensed directly from this spigot into bottles without disturbing the residue in the pot. If desired a bottle-filling tube (not seen in the drawing Figures) can be connected to the is spigot 16*a* and extended to the bottom of each beer bottle so that the bottle is filled from the bottom to the top for minimal aeration. However, this precaution has been found to be not necessary.

The bottles are then capped and the beer is aged while the carbonating fermentation proceeds using the priming sugar and yeast. After this fermentation, further ageing of the beer is sometimes used to allow it to achieve its desired flavor, aroma, and essence. The remaining yeast dies off from lack of sugar to metabolize in combination with the alcohol content of the beer. After the beer is aged, it is ready for consumption. Understandably, bottle-conditioned beer has a small residue at the bottom of each bottle, so the beer is poured off, and consumed from a glass, leaving the residue in the bottle.

FIGS. 15*a* and 15*b* provide a perspective view of an alternative brew pot for use with the present machine and brewing process. FIG. 15*b* is a fragmentary perspective view in cross section to improve the clarity of illustration. In order to obtain reference numerals for use in describing this alternative embodiment of brew pot, features which are the same or analogous in structure or function to those depicted and described above are referenced with the same numeral used above and increased by one-hundred (100). A lid for this brew pot 116 is not illustrated in FIGS. 15*a* and 15*b* because the same lid 18 depicted and described above is used. Considering FIG. 15*a*, it is seen that the brew pot 116 includes all of the features of brew pot 16 described above.

However, brew pot 116 also includes a water cooling jacket (generally referenced with numeral 116*b*) disposed on the side wall of the brew pot above the level at which the temperature sensor 34 contacts the brew pot. The water cooling jacket 116*b* is formed by an outer jacket or wall member 116*c* sealingly attached at its upper and lower circumferential margins (as by welding or brazing, for example) about the pot 116, and having a pair of hose barbs 116*d* adjacent to but on opposite circumferential sides of an internal partition 116*e*. In the embodiment illustrated, the partition 116*e* is formed by a vertical crease 116*e* in the jacket wall 116*c*, and indicated on FIG. 15*a* by the arrowed numeral 116*e* (i.e., the crease which is visible on the outside of the jacket 116*b* inwardly forms the partition). That is, the crease 116*e* extends radially inwardly close to the wall of the brew pot 116.

Because of the internal partition 116*e*, water admitted to the circumferentially extending annular space 116*f* between the jacket 116c and the remainder of the brew pot 116 at one hose barb 116d will flow circumferentially about the pot and exit at the other hose barb 116d. The user of this brew pot can conveniently and optionally use water chilling of the wort after the heating phase of the brewing process to chill the wort toward the temperature of 90° F. at which the yeast will be added by the machine 12. In order to use the water cooling jacket 116b, the user connects a hose from a cool water source to one of the hose barbs 116d, and a hose from the other hose barb to drain.

Because the machine 12 is under temperature control during the phase of the process in which water chilling of the wort may be used, no difference (other than the shorter cooling time for the wort to reach 90° F.) will be experienced. When the temperature sensor 34 indicates that the wort has cooled to 90° F., this will be sensed by the controller 126, and the yeast will be automatically dispensed into the wort. The brewing process continues with the fermentation interval as before.

After use, the brew pot 16 (or 116), lid 18, turn table 78 and cups 30 go right into a dish washer, or into the dish pan, for cleaning. Because the wort is never boiled with the machine 10, there is no risk at all of boiling over the brew pot and making a mess that way. Only a single vessel (brew pot 16 or 116, with lid 18) is used, so not much clean up is required.

While the present invention has been depicted, described, and is defined by reference to a single particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, the brewing process according to the present invention can be carried out with a machine that does not automatically dispense the ingredients. That is, the machine may simply summon a human attendant who then adds the ingredients manually via the opening 42. Alternatively, the dispensing mechanism 28 may be manually actuated rather than power driven. In such a case, provision would be made on the exterior of the machine for the user to index the dispensing table 78 by one cup position each time the machine indicates that ingredients are to be added to the wort. In each case, the machine would operate under temperature control, so that boiling of the wort is avoided, and the user need not worry about the pot 16 boiling over. Still alternatively, the brew pot could be provided with a reversed-Peltier effect type of thermoelectric chiller in order to remove heat from the wort more quickly than natural cooling and still without the need to use water chilling of the wort. Accordingly, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. An automated machine for home-brewing beer, said machine comprising:
   a housing having a heater, a first power drive means, a second power drive means, and an ingredients dispenser;
   a removable brew pot receivable into cooperation with the housing in heat transfer relation with the heater for heating beer wort in the brew pot;
   a lid for covering the brew pot, said lid defining an aperture through which ingredients may be dispensed into the brew pot, said housing and lid being configured so that when the removable brew pot is received into cooperation with the housing home-brewing without contamination by ambient microbes is facilitated;
   a stirrer extending into the brew pot, said stirrer cooperating with said first power drive means so as to be in driving relation with the stirrer when the brew pot is in cooperation with the housing;
   said ingredients dispenser including plural ingredients containers, and second power drive means for driving said ingredients dispensing mechanism for dispensing ingredients from said ingredients containers into said brew pot;
   a programmable controller for controlling said heater, said first power drive means, and said second power drive means.

2. The machine of claim 1 further including a temperature sensor probe carried by said housing for sensing the temperature of beer wort in said brew pot.

3. The machine of claim 2 wherein said controller includes program means for effecting natural cooling of beer wort in said brew pot, and for addition of yeast thereto by actuation of said ingredients dispensing mechanism as a function only of temperature of said beer wort after cooling naturally to a selected temperature from a higher temperature, whereby said yeast is added only to a sufficiently cool wort so as to prevent shock or death of the yeast.

4. The machine of claim 1 wherein said brew pot and said lid cooperatively define a labyrinth seal, and said brew pot and lid with said labyrinth seal both cooperatively protect the wort from ambient microbes, and allow escape of fermentation gas between the container and the lid without use of a fermentation water-lock.

5. An automated machine for simplified, low-temperature, single-vessel, home-brewing of beer, said machine comprising:
   a housing having a base portion, an intermediate portion above the base portion, and an upper portion on the intermediate portion, the housing portions cooperatively defining a recess for removably receiving a brew pot and cover, a temperature sensor in the recess for contacting the brew pot in heat transfer relation to sense the temperature of beer wort therein, and the housing on the base portion carrying a hot-plate heater having a heating surface, a power drive for a stirrer, and an incremental-movement power-drive ingredients dispenser;
   a removable brew pot receivable into said recess in cooperation with the housing and on said heating surface in heat transfer relation for heating beer wort in the brew pot;
   a lid for covering the brew pot, said lid defining an aperture through which ingredients may be dispensed into the brew pot from said power-drive ingredients dispenser, said lid carrying a stirrer extending into the brew pot toward but short of a bottom thereof, cooperative drive means connecting the stirrer with the power-drive for a stirrer when said brew pot and cover are received into said recess;
   said housing upper portion carrying said incremental-movement power-drive ingredients dispenser, said ingredients dispenser including plural ingredients containers carried upon a turntable member rotational on said upper housing portion, and incremental power drive means for driving said ingredients dispenser for dispensing ingredients from said ingredients containers into said brew pot via said aperture in response to incremental rotational motion of the turn table member, said power drive means including:
- a reversible motor;
- a gear rotating in respective opposite directions in response to respective forward and reverse operations of said motor;
- a toggle member pivoting between respective first and second positions in response to rotation of said gear in respective opposite directions;
- said toggle member carrying a first pinion meshed with said gear and driving a second pinion;
- said toggle member also carrying a third pinion meshed with said gear, and driving a fourth pinion via a direction-reversing drive, said second pinion and said fourth pinion being spaced circumferentially apart relative to said turn table member;
- said turn table member peripherally defining a gear section divided into plural respective gear sectors by plural circumferentially spaced apart intervening notches having no gear teeth; and
- in each of said first and said second positions of said toggle member said second and said fourth pinions respectively meshing with a gear segment of said turn table member to rotate said turn table member in a single direction regardless of direction of operation of said motor until the meshed pinion runs off a gear segment into a notch to stop rotation of said turn table member, continued operation of said motor in the same direction with a pinion in a notch not rotating said turn table member;
- whereby, reversing direction of operation of said motor pivots said toggle member to the other of said first and second positions, and meshes the other of said second and fourth pinions with a gear segment to again rotate said turn table member in said single direction regardless of direction of rotation of said motor; and
- a programmable controller for controlling said heater, said first power drive means, and said second power drive means.

6. The machine of claim 5 wherein said controller includes programming responsive to temperature sensed by said temperature sensor to control said heater so as to not boil said beer wort in said brew pot.

7. The machine of claim 5 wherein said turn table member includes plural ingredients containers and plural aperture-cover portions alternating with one another circumferentially of said turn table member, a respective one of said plural aperture-cover portions aligning with said aperture when said second pinion runs off a gear segment to stop said turn table member.

8. The machine of claim 5 wherein each of said plural ingredients containers and said housing defining cooperating means for dispensing ingredients from one of said ingredients containers as said turn table member rotates incrementally between stops to pass the one ingredients container over said aperture.

9. The machine of claim 8 wherein said cooperating means for dispensing ingredients from one of said ingredients containers includes said plural ingredients containers being circumferentially arrayed on said turn table member, and each container being configured as an ingredient cup pivotally supported on said turn table member, said housing carrying means for tipping the one of said ingredient cups passing over said aperture, and the turn table member having a funnel-like wall section disposed below each ingredient cup and disposed to deflect ingredients therefrom into said aperture.

10. The machine of claim 5 wherein said motor drives both of said power drive for a stirrer, and said incremental-movement power-drive ingredients dispenser; said cooperative drive means connecting the stirrer with the power-drive for a stirrer when said brew pot and cover are received into said recess including a drive gear drivingly connected with said motor, and a driven gear carried by said stirrer and meshing with said drive gear when said brew pot and cover are in said recess.

11. An brew pot with lid for use in automated home-brewing of beer, said brew pot with lid comprising:
- a brew pot portion having a bottom wall and a side wall, said walls cooperatively defining an upwardly opening cavity in the brew pot, and the side wall having a lip defining an opening to said cavity;
- a removable lid portion for covering the brew pot, said lid defining a peripheral skirt having a circumferential downwardly opening groove receiving said lip and cooperating therewith to define a labyrinth seal with the brew pot portion, said lid further having an aperture through which ingredients may be dispensed into the brew pot, said lid carrying a stirrer extending into said brew pot cavity toward but short of said bottom wall, and externally-exposed power drive means for said stirrer; whereby said brew pot and lid with said labyrinth seal both cooperatively protect beer wort in said cavity from ambient microbes, allow escape of fermentation gas between the brew pot portion and the lid portion via said labyrinth seal without use of a fermentation water-lock, and allowing power-drive stirring of said beer wort.

12. An automated machine for home-brewing beer, said machine comprising:
- a housing;
- a heater;
- a stirrer with power drive means;
- an ingredients dispenser;
- a temperature sensor providing a temperature output signal;
- a brew pot in heat transfer relation with both the heater and temperature sensor;
- a lid for covering the brew pot, said lid defining an aperture through which ingredients may be added to the brew pot;
- said ingredients dispenser including plural ingredients containers for dispensing ingredients into said brew pot via said aperture;
- a programmable controller receiving said temperature output signal and controlling said heater in accordance with a programmed procedure for home-brewing beer programmed in the controller.

13. The machine of claim 12 further including said programmable controller controlling said power drive means.

14. The machine of claim 12 wherein said programmable controller includes program means for commanding addition of yeast to beer wort in said brew pot as a function only of temperature of said beer wort.

15. The machine of claim 14 wherein said ingredients dispenser includes an additional power drive means effecting dispensing of ingredients into said brew pot, said programmable controller controlling also said second power drive means and including program means for commanding addition of ingredients to beer wort in said brew pot, ingredients other than yeast being added to said beer wort as a function of both time and temperature.

16. The machine of claim 12 wherein said brew pot further includes a water cooling jacket.

17. The machine of claim 12 wherein said programmable controller effects temperature control of wort in said brew pot to heat said wort to a temperature and always below boiling.

18. The machine of claim 17 wherein said temperature is in the range from about 140° F. to about 205° F., and is below boiling temperature.

* * * * *